US012468236B2

United States Patent
(12) United States Patent
Seino et al.

(10) Patent No.: US 12,468,236 B2
(45) Date of Patent: Nov. 11, 2025

(54) EXTERNAL ADDITIVE FOR TONER, AND TONER

(71) Applicant: CANON KABUSHIKI KAISHA, Tokyo (JP)

(72) Inventors: Yuzo Seino, Shizuoka (JP); Daisuke Yoshiba, Shizuoka (JP); Koki Inoue, Shizuoka (JP); Yuki Masuda, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 718 days.

(21) Appl. No.: 17/808,750

(22) Filed: Jun. 24, 2022

(65) Prior Publication Data

US 2023/0004099 A1 Jan. 5, 2023

(30) Foreign Application Priority Data

Jul. 2, 2021 (JP) ................................ 2021-110963
Jun. 2, 2022 (JP) ................................ 2022-090407

(51) Int. Cl.
*G03G 9/097* (2006.01)
*G03G 9/08* (2006.01)

(52) U.S. Cl.
CPC ....... *G03G 9/09725* (2013.01); *G03G 9/0819* (2013.01)

(58) Field of Classification Search
CPC ......................... G03G 9/09725; G03G 9/0819
See application file for complete search history.

(56) References Cited

U.S. PATENT DOCUMENTS

| | | | |
|---|---|---|---|
| 7,537,877 | B2 | 5/2009 | Yoshiba |
| 7,544,455 | B2 | 6/2009 | Yoshiba |
| 7,700,254 | B2 | 4/2010 | Moribe |
| 7,740,998 | B2 | 6/2010 | Yamazaki |
| 7,796,926 | B2 | 9/2010 | Matsuda |
| 7,855,042 | B2 | 12/2010 | Kobori |
| 8,057,977 | B2 | 11/2011 | Moribe |
| 9,097,998 | B2 | 8/2015 | Yamazaki |
| 9,128,400 | B2 | 9/2015 | Takahashi |
| 9,201,323 | B2 | 12/2015 | Nishikawa |
| 9,250,548 | B2 | 2/2016 | Nomura |

(Continued)

FOREIGN PATENT DOCUMENTS

| | | | | |
|---|---|---|---|---|
| CN | 1489003 A | | 4/2004 | |
| EP | 3582015 A1 | * | 12/2019 | ........... G03G 9/0806 |

(Continued)

OTHER PUBLICATIONS

U.S. Appl. No. 17/814,102, Tsuneyoshi Tominaga, filed Jul. 21, 2022.
U.S. Appl. No. 17/819,385, Daisuke Yoshiba, filed Aug. 12, 2022.

*Primary Examiner* — Peter L Vajda
*Assistant Examiner* — Jenna Kuipers
(74) *Attorney, Agent, or Firm* — VENABLE LLP

(57) ABSTRACT

An external additive for a toner comprising a silica particle surface-treated with a polyhydric acid metal salt particle, wherein the polyhydric acid metal salt particle is particle of a salt of a polyhydric acid and a titanium compound, and a toner comprising a toner particle, and an external additive for a toner on the surface of the toner particle, wherein the external additive for a toner is the above external additive for a toner.

6 Claims, 3 Drawing Sheets

(56) References Cited

U.S. PATENT DOCUMENTS

| | | | |
|---|---|---|---|
| 9,261,804 | B2 | 2/2016 | Yamazaki |
| 9,341,970 | B2 | 5/2016 | Yoshiba |
| 9,606,462 | B2 | 3/2017 | Nomura |
| 9,829,818 | B2 | 11/2017 | Yoshiba |
| 9,971,263 | B2 | 5/2018 | Fukudome |
| 10,101,683 | B2 | 10/2018 | Nishikawa |
| 10,289,016 | B2 | 5/2019 | Fukudome |
| 10,295,921 | B2 | 5/2019 | Ohmori |
| 10,578,990 | B2 | 3/2020 | Tsuda |
| 10,635,010 | B2 | 4/2020 | Kamikura et al. |
| 10,732,529 | B2 | 8/2020 | Yoshiba |
| 10,782,623 | B2 | 9/2020 | Yoshiba |
| 10,852,650 | B2 | 12/2020 | Inoue |
| 10,942,463 | B2 | 3/2021 | Yoshiba |
| 11,099,493 | B2 | 8/2021 | Komiya |
| 11,169,458 | B2 | 11/2021 | Toyoizumi |
| 11,175,600 | B2 | 11/2021 | Uchiyama |
| 11,181,844 | B2 | 11/2021 | Nagaoka |
| 11,256,187 | B2 | 2/2022 | Ogaki |
| 11,262,666 | B2 | 3/2022 | Yoshiba |
| 11,314,178 | B2 | 4/2022 | Kenmoku |
| 11,347,157 | B2 | 5/2022 | Kamikura |
| 2004/0096765 | A1 | 5/2004 | Miyakawa et al. |
| 2005/0058924 | A1* | 3/2005 | Miyakawa ......... G03G 9/09725 430/108.7 |
| 2013/0252167 | A1 | 9/2013 | Moribe |
| 2014/0004460 | A1 | 1/2014 | Yoshiba |
| 2015/0220013 | A1 | 8/2015 | Nishikawa |
| 2016/0161874 | A1 | 6/2016 | Yamazaki |
| 2018/0275542 | A1 | 9/2018 | Mori |
| 2019/0235404 | A1* | 8/2019 | Kamikura .......... G03G 9/09791 |
| 2021/0026264 | A1 | 1/2021 | Kamikura et al. |
| 2021/0026265 | A1 | 1/2021 | Kamikura |
| 2021/0063901 | A1 | 3/2021 | Terui |
| 2021/0063902 | A1 | 3/2021 | Inoue |
| 2021/0318630 | A1 | 10/2021 | Terui |
| 2021/0382406 | A1 | 12/2021 | Yamashita |
| 2022/0026821 | A1 | 1/2022 | Amano |
| 2022/0171302 | A1 | 6/2022 | Sato |

FOREIGN PATENT DOCUMENTS

| | | | |
|---|---|---|---|
| JP | 59-52255 | A | 3/1984 |
| JP | 2006-154877 | A | 6/2006 |
| JP | 2006-267734 | A | 10/2006 |
| JP | 2017-134157 | A | 8/2017 |
| JP | 2018-163209 | A | 10/2018 |

* cited by examiner

EXTERNAL ADDITIVE FOR TONER, AND TONER

BACKGROUND OF THE INVENTION

Field of the Invention

The present disclosure relates to an external additive for a toner, and a toner that are used in an image-forming method such as an electrophotographic method.

Description of the Related Art

The fields of using image forming apparatuses that utilize an electrophotographic system have expanded and become more diverse in recent years, from printers and copiers to commercial printing machines. In response to this, higher speeds and higher quality are required in image forming apparatuses.

The charging characteristics, flowability, durability and so forth of the toner used in image forming apparatuses are ordinarily controlled by an external additive that is present on the toner surface, whereby characteristics optimized for the process of the electrophotographic system are obtained. Inorganic fine particles typified for instance by silica and titanium oxide are used as the external additive.

Generally, silica exhibits excellent flowability, but tends to be susceptible to charge-up, has low environmental stability, and has low charge performance stability. By contrast, titanium oxide has high conductivity and is therefore excellent in charging performance stability; however, titanium oxide is prone to suffer from charge leakage, and tends to yield a small electrification charge amount. Moreover, the external additive tends to become embedded into the toner particle over long-term use, on account of low flowability of titanium oxide, so that degradation of toner proceeds readily. Inorganic oxides such as silica used as the external additive have hydroxyl groups on the surface, and accordingly are hydrophilic, and characteristically absorb moisture readily. This has therefore a significant impact on electrification charge amount and conductivity, which are electrical characteristics, since hydroxyl groups on the surface dissociate on account of the absorbed moisture.

External additives having a sufficient electrification charge amount, exhibiting excellent charging performance stability, and having high flowability are thus required, and surface treatment methods of various external additives have been proposed in which silica or titanium oxide is utilized. Japanese Patent Application Publication No. S59-52255 discloses titanium oxide hydrophobized with an alkyltrialkoxysilane having an alkyl group from C6 to C8, an external additive, with a view to improving the flowability of a toner. Japanese Patent Application Publication No. 2017-134157 discloses an external additive in which titania fine particles are caused to adhere to the surface of a silica core, and the titania fine particles being coated with a thermosetting nitrogen resin. Further, Japanese Patent Application Publication No. 2018-163209 discloses an external additive that utilizes concomitantly a powder of silica particles having, on the surface, an alkyl group from C8 to C16, an amino group, and titania particles having amino groups on the surface.

SUMMARY OF THE INVENTION

The external additive disclosed in Japanese Patent Application Publication No. S59-52255 contains titanium oxide. Titanium oxide powders ordinarily has a volume resistivity of $1.0\times10^7$ (Ω·m) to $1.0\times10^9$ (Ω·m). Titanium oxide has high conductivity, and accordingly a toner using an external additive that contains titanium oxide exhibits a lower electrification charge amount and a lower charge attenuation characteristic, which makes transfer defects likely to occur.

In Japanese Patent Application Publication No. 2017-134157, composite particles of silica particles and titania particles are used as an external additive, but the silica particles and the titania particles are not chemically bonded to each other. Moreover, it is extremely difficult to uniformly disperse titania particles on the surface of silica particles having identical polarity sign as that of titania particles. Furthermore, titania has high conductivity, and accordingly the volume resistivity of the toner is lower. There is accordingly room for improvement in terms of ensuring both of electrification charge amount and stability.

When the external additive disclosed in Japanese Patent Application Publication No. 2018-163209 is used, since the volume resistivity of the toner becomes readily lower, in relative terms, than the volume resistivity of a printing intermediate transfer member or a transfer roller that utilizes the toner, the electrification charge amount of the toner drops, and transfer derived from Coulomb forces is less likely to occur. Therefore, the external additive disclosed in Japanese Patent Application Publication No. 2018-163209 is prone to suffering from transfer defects, similarly to Japanese Patent Application Publication No. S59-52255, and has room for improvement.

The present disclosure is directed to provide an external additive, and a toner, having a sufficient electrification charge amount, exhibiting excellent charging performance stability, and having high flowability.

The present disclosure relates to an external additive for a toner comprising a silica particle surface-treated with a polyhydric acid metal salt particle, wherein the polyhydric acid metal salt particle is particle of a salt of a polyhydric acid and a titanium compound.

The present disclosure also relates to a toner comprising a toner particle, and an external additive for a toner on the surface of the toner particle, wherein the external additive for a toner is the above external additive for a toner.

The present disclosure allows providing an external additive, and a toner, having a sufficient electrification charge amount, exhibiting excellent charging performance stability, and having high flowability. Further features of the present disclosure will become apparent from the following description of exemplary embodiments with reference to the attached drawings.

DESCRIPTION OF THE EMBODIMENTS

Figure 1:
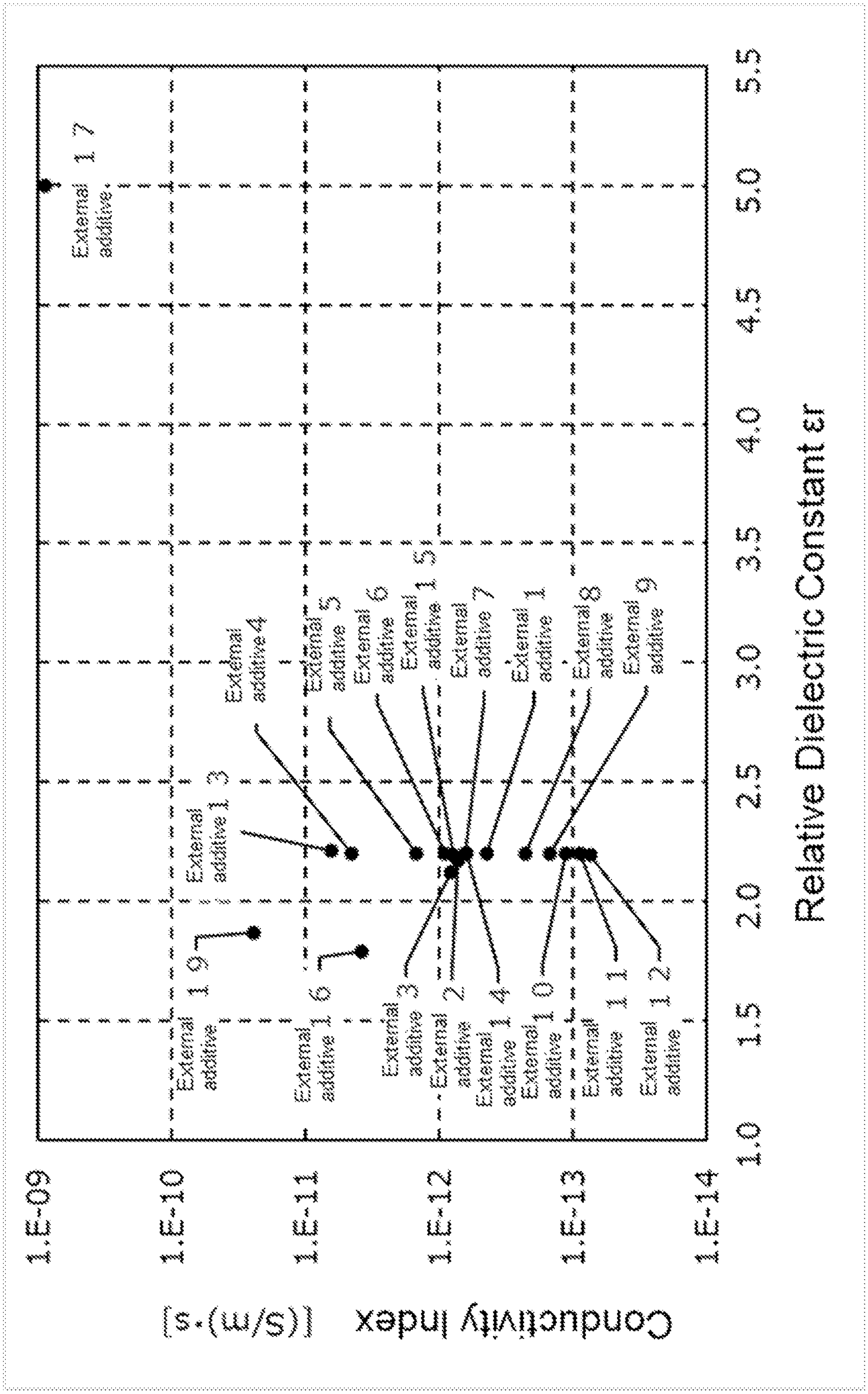
FIG. 1 is a diagram illustrating a relationship between relative dielectric constant and a conductivity index in External additives 1 to 19.

Embodiments will be explained in detail hereafter, but the present disclosure is not limited to the following description.

Unless otherwise specified, the description of "from XX to YY" or "XX to YY" indicating a numerical range means a numerical range including a lower limit and an upper limit which are end points. When a numerical range is described step by step, the upper and lower limits of each numerical range can be arbitrarily combined.

The present disclosure relates to an external additive for a toner comprising a silica particle surface-treated with a polyhydric acid metal salt particle, wherein the polyhydric acid metal salt particle is a particle of a salt of a polyhydric acid and a titanium compound.

Further, the present disclosure relates to a toner comprising a toner particle, and the above external additive for the toner.

The inventors found that by using particles of a salt of a polyhydric acid and a titanium compound, as a surface modification agent of silica particles, it becomes possible to provide an external additive for a toner, and a toner, having a sufficient electrification charge amount, being excellent in charging performance, and being capable of ensuring high flowability. The inventors surmise the following concerning the underlying reasons for this.

Silica particles have high volume resistivity, but are hydrophilic on account of hydroxyl groups (silanol groups) on the surface, and accordingly silica particles exhibit the characteristic of readily absorbing moisture. When silica particles absorb moisture, the hydroxyl groups become dissociated on account of such moisture; as a result, this has a significant impact on electrification charge amount and conductivity, which are electrical characteristics. The inventors considered that electrification charge amount and charging stability can be ensured by subjecting the surface of the silica particles to a chemical surface treatment using a titanium-based material, which is excellent in charging stability.

Titanium oxide is ordinarily exemplified as a titanium-based material used in external additives for a toner, but chemical interactions with silica particles and titanium oxide are difficult to achieve. Moreover, a conceivable method may involve relying on hydrolysis and polycondensation reactions, to chemically bond a titanium alkoxide to the hydroxyl groups on the surface of the silica particles. However, titanium alkoxides exhibit high reaction rates in aqueous systems, and the reactions are difficult to control, which makes titanium alkoxides problematic for instance in terms of dispersibility. That is because water coordinates with the titanium alkoxide, with subsequent formation of Ti—OH that reacts with the titanium alkoxide of other molecules, to form as a result metalloxane bonds (Ti—O—Ti bonds). A further conceivable reason is that this reaction occurs continuously, giving rise to a polytitanoxane structure.

Therefore, the inventors found that interactions with silica particles can be achieved stably and uniformly, with controlling the reaction rate, by using particles of a polyhydric acid metal salt as a surface treatment agent, which are particles of a salt of a polyhydric acid and a titanium compound.

Polyhydric acids accept electron pairs and readily become negatively charged. Furthermore, titanium is a group 4 element and is most stable when the oxidation number thereof is +4. The titanium compound forms as a result a crosslinked structure with the polyhydric acid, such that the movement of electrons is promoted by the crosslinked structure; this allows improving the charge rising property, while suppressing occurring charge-up, and allows ensuring excellent charging stability. Further, the reaction products of the polyhydric acid and titanium which is a group 4 element afford good environmental stability through blocking of water molecules by the crosslinked structure. It is deemed that the polyhydric acid metal salt particles, which are particles of a salt of a polyhydric acid and a titanium compound, react with the hydroxyl groups on the surface of the silica particles, forming metalloxane bonds (Si—O—Ti bonds) as a result. In consequence, external additive particles can be obtained that integrate together characteristics of silica and characteristics of metal particles. The hydroxyl groups on the surface of the silica particles react with the polyhydric acid metal salt particles, to form metalloxane bonds, so that the number of hydroxyl groups that dissociate on the surface of the silica particles decreases as a result. Electrification charge amount ordinarily drops, on account of leakage currents, in a case where conductivity is too high, i.e. in a case where volume resistivity is too low. Further, charge-up occurs in a case where the conductivity is too low, i.e. in a case where volume resistivity is too high. When the silica particles are surface-treated with polyhydric acid metal salt particles, by contrast, the movement of electrons is controlled as described above, thanks to which proper conductivity (volume resistivity) can be obtained as a result. In consequence, leakage current can be controlled, capacitance can be increased, and a charging rising property and occurrence of charge-up can be suppressed, and then improved charging performance stability.

By using thus polyhydric acid metal salt particles as a surface treatment agent, while ensuring high flowability through the use of the of silica particles as cores, it is possible to obtain an external additive for a toner that allowed ensuring charge amount combined with charging stability. There has never been an external additive for a toner with the above configuration; the inventors have thus been first in successfully obtaining an external additive for a toner having the above configuration, and a toner that utilizes the external additive for a toner.

The method for surface-treating the polyhydric acid metal salt particles on the surface of the silica particles is not particularly limited, and may be one of the following methods. For instance, a method may involve adding a polyhydric acid and a titanium compound to a dispersion of silica particles, with mixing of the whole, to thereby cause the polyhydric acid metal salt particles to react, and obtain a reaction product, while at the same time the dispersion is stirred, to elicit adhesion to and reaction with the surface of the silica particles, and yield in turn surface-treated silica particles. Another method may involve adding polyhydric acid metal salt particles, generated beforehand, to a dispersion of silica particles, and mixing the whole, to elicit adhesion to and reaction with the surface of the silica particles, and yield surface-treated silica particles.

A conventionally known polyhydric acid can be used, without particular limitations, as the polyhydric acid. Concrete examples of polyhydric acids include inorganic acids such as phosphoric acid (trivalent), carbonic acid (divalent) and sulfuric acid (divalent); and organic acids such as dicarboxylic acids (divalent) and tricarboxylic acids (trivalent). Concrete examples of organic acids include dicarboxylic acids such as oxalic acid, malonic acid, succinic acid, glutaric acid, adipic acid, fumaric acid, maleic acid, pimelic acid, suberic acid, azelaic acid, sebacic acid, phthalic acid, isophthalic acid and terephthalic acid; and tricarboxylic acids such as citric acid, aconitic acid and trimellitic anhydride.

The polyhydric acid preferably comprises an inorganic acid. Inorganic acids have a more rigid molecular skeleton than organic acids, and accordingly exhibit smaller changes in properties upon long-term storage. Stable characteristics can therefore be obtained even after long-term storage. The polyhydric acid more preferably comprises at least one selected from the group consisting of phosphoric acid, carbonic acid and sulfuric acid, and yet more preferably is phosphoric acid. In a case where the polyhydric acid is phosphoric acid, a stronger and more stable surface layer can be formed, by virtue of the fact that a pyrophosphate skeleton becomes formed, as a crosslinked body, between the polyhydric acid and the titanium compound, at the time of formation of metalloxane bonds (Si—O—Ti bonds) as a result of a reaction between particles of a salt of phosphoric acid and a titanium compound with hydroxyl groups on the surface of the silica particles. Further, the manner of addition to an aqueous medium may involve addition of the polyhydric acid itself, or addition of water-soluble polyhydric acid metal salt particles to an aqueous medium, with dissociation in the aqueous medium.

A known titanium compound can be used as the titanium compound, without particular limitations, so long as the titanium compound yields a polyhydric acid metal salt through reaction with polyhydric acid ions. Concrete examples of the titanium compound include at least one selected from the group consisting of titanium lactate, titanium tetraacetylacetonate, an ammonium salt of titanium lactate, titanium triethanolaminate, and the like. Preferred among the foregoing are titanium chelates, since these the reaction is readily controlled, and titanium chelates react quantitatively with polyhydric acid ions. A lactic acid chelate such as titanium lactate is more preferable from the viewpoint of solubility in an aqueous medium.

Concrete examples of the polyhydric acid metal salt particles include particles of a salt of a polyhydric acid such as phosphoric acid, sulfuric acid, carbonic acid or oxalic acid, and a titanium compound. Examples include titanium phosphate compounds, titanium sulfate compounds, titanium carbonate compounds and titanium oxalate compounds. The polyhydric acid preferably comprises at least one selected from the group consisting of sulfuric acid, carbonic acid and phosphoric acid; more preferably, the polyhydric acid is phosphoric acid. Phosphate ions afford high strength derived from cross-linking across metals, and are superior also in charge rising performance by virtue of having ionic bonds within the molecule; accordingly, the polyhydric acid metal salt particles more preferably include particles of a salt of phosphoric acid and a titanium compound.

Preferably, Si—O—Ti bonds are formed by the polyhydric acid metal salt particles, in the surface-treated silica particles. The silica particles having been surface-treated with the polyhydric acid metal salt particles preferably form metalloxane bonds (Si—O—Ti bonds) between the hydroxyl groups (silanol groups) on the surface of the silica particles and the polyhydric acid metal salt particles. As a result, capacitance increases (that is, relative dielectric constant increases), so that a sufficient electrification charge amount can be ensured. Moreover, the amount of hydroxyl groups on the surface of the silica particles is reduced, and therefore the conductivity decreases (i.e. the volume resistivity increases), it becomes possible to suppress drops in the electrification charge amount derived from leakage current, and to ensure a sufficient electrification charge amount. Preferably, a crosslinked body between the polyhydric acid and the titanium compound is formed in the polyhydric acid metal salt particles. By virtue of this crosslinked body, electron movement is promoted and appropriate conductivity is achieved such that the charging rising property on toner can be improved, occurrence of charge-up can be suppressed, and excellent charging stability can be ensured. Moreover, environmental stability is improved by virtue of the fact that the polyhydric acid metal salt particles can block water molecules thanks to the crosslinked body.

The number-average particle diameter of the primary particles of the polyhydric acid metal salt particles can be observed using a transmission electron microscope (TEM). The number-average particle diameter of the primary particles of the polyhydric acid metal salt particles is preferably 2.0 to 10.0 nm and more preferably 2.0 to 5.0 nm to increase the attachment force (van der Waals force) between the silica particles and the toner particle. The polyhydric acid metal salt particles may be present on the silica particles in a partially aggregated state, and the height of the aggregate with respect to the normal direction of the silica particles is preferably 50 nm or less.

The primary particle diameter and aggregated state of the polyhydric acid metal salt particles can be controlled by the shear energy of the stirring device and the addition rate and concentration of the titanium compound.

The content of the polyhydric acid metal salt particle in the silica particle is preferably 0.01 to 1.00 mass %, and more preferably 0.05 to 0.20 mass %. In a case where the content is 0.01 to 1.00 mass %, a certain amount of hydroxyl groups on the surface of the silica particles reacts with the polyhydric acid metal salt particles to form metalloxane bonds, such that conductivity drops, volume resistivity increases, and relative dielectric constant increases, thanks to which occurrence of charge-up is suppressed and a sufficient electrification charge amount is obtained. The content of the polyhydric acid metal salt particles in the silica particles can be controlled on the basis of the addition amounts of the silica particles, the polyhydric acid, the titanium compound or the polyhydric acid metal salt particles, the specific surface area of the silica particles, and the type of the polyhydric acid metal salt particles.

The number-average particle diameter of the silica particle is preferably 7 to 600 nm, more preferably 10 to 500 nm. In a case where the number-average particle diameter is smaller than 7 nm, van der Waals force become dominant in the silica particles, and there increases non-electrostatic attachment force between toner particles, or between a toner and a developing roller or intermediate transfer member. The flowability, durability and transferability of the toner tend to decrease on account of this non-electrostatic attachment force. In a case where the number-average particle diameter of the silica particles exceeds 600 nm, an external force readily acts on the silica particles that are externally added to the toner during stirring of the toner, and the silica particles are prone to become embedded or to migrate. As a result, the toner surface becomes inhomogeneous, and is likely to cause fogging and reduced image density.

For the same reason, the number-average particle diameter of the silica particle surface-treated with a polyhydric acid metal salt particle is preferably 9 to 604 nm, more preferably 14 to 504 nm.

The BET specific surface area of the silica particles is preferably from 6 $m^2/g$ to 290 $m^2/g$, more preferably from 7 $m^2/g$ to 210 $m^2/g$. The larger the BET specific surface area of the silica particles, the smaller becomes the number-average particle diameter of the silica particles, whereas the smaller the BET specific surface area of the silica particles, the larger becomes the number-average particle diameter of the silica particles. In a case where the BET specific surface area exceeds 290 $m^2/g$, van der Waals force becomes dominant in the silica particles, and there increases non-electrostatic attachment force between toner particles, or between toner and a developing roller or intermediate transfer member. The flowability, durability and transferability of the toner tend to decrease on account of this non-electrostatic attachment force. In a case where the BET specific surface area of the silica particles is smaller than 6 $m^2/g$, external force readily acts on the silica particles that are externally added to the toner during stirring of the toner, and the silica particles are prone to become embedded or to migrate. As a result, the toner surface becomes inhomogeneous, and is likely to cause fogging and reduced image density.

The silica particles are not particularly limited, and may be silica particles obtained in accordance with a wet method, such as sol-gel method silica particles, gel method silica particles, aqueous colloidal silica particles, alcoholic silica particles; or fused silica particles; or silica particles obtained in accordance with a vapor-phase method, such as deflagration-method silica particles. Preferred among the foregoing are sol-gel silica particles obtained in accordance with a sol-gel method. In the sol-gel method, an alkoxysilane is subjected to hydrolysis and condensation reactions, in an organic solvent in which the water is present, to obtain a silica sol suspension from which the solvent is then removed, with drying, to yield silica fine particles. The sol-gel silica particles have numerous hydroxyl groups (silanol groups) on the surface, and accordingly a uniform surface treatment is more readily achieved through a reaction between the hydroxyl groups and the polyhydric acid metal salt particles. Moreover, the sol-gel silica particles have high circularity and a sharp particle size distribution, and hence the characteristics of the sol-gel silica particles as an external additive do not fluctuate readily.

The relative dielectric constant of the external additive for a toner at the frequency at which a dielectric loss tangent tan $\delta$ is minimal is preferably from 2.10 to 2.20. In a case where relative dielectric constant is 2.10 or higher, a certain amount of hydroxyl groups on the surface of the silica particles reacts with the polyhydric acid metal salt particles to form metalloxane bonds, and a crosslinked body of the polyhydric acid and the titanium compound is formed, and a sufficient electrification charge amount can be thus imparted to the external additive for a toner. The relative dielectric constant can be controlled on the basis of the addition amount of silica particles, the polyhydric acid, the titanium compound or the polyhydric acid metal salt particles. Measurements of relative dielectric constant will be described further on.

With volume resistivity as the reciprocal of electrical conductivity $\kappa$ at a measurement frequency of 0.021 Hz, the volume resistivity of the external additive for a toner is preferably $1.54\times10^{12}$ ($\Omega\cdot$m) or higher, and more preferably $2.19\times10^{12}$ ($\Omega\cdot$m) or higher, and yet more preferably $6.58\times10^{12}$ ($\Omega\cdot$m) or higher. The volume resistivity is preferably $1.32\times10^{14}$ ($\Omega\cdot$m) or lower, and more preferably $1.10\times10^{14}$ ($\Omega\cdot$m) or lower. In a case where the volume resistivity is $1.54\times10^{12}$ ($\Omega\cdot$m) or higher, a certain amount of hydroxyl groups on the surface of the silica particles react with the polyhydric acid metal salt particles to form metalloxane bonds, and a crosslinked body of the polyhydric acid and the titanium compound is formed, such that occurrence of charge-up is suppressed in the external additive for a toner and charging performance stability increases, thanks to which the toner that is produced using the external additive for a toner exhibits good developing performance and transferability. Further, the volume resistivity can be controlled on the basis of the addition amount of the silica particles, the polyhydric acid, the titanium compound or the polyhydric acid metal salt particles. A measurement of volume resistivity will be described further on.

With a conductivity index $\kappa/\omega$ defined as a value resulting from dividing the electrical conductivity $\kappa$ at a measurement frequency of 1 Hz by the angular frequency $\omega$, the conductivity index $\kappa/\omega$ of the external additive for a toner is preferably $6.44\times10^{12}$ (S/m)$\cdot$s or lower, more preferably $4.51\times10^{-12}$ (S/m)$\cdot$s or lower, and yet more preferably $1.50\times10^{-12}$ (S/m)$\cdot$s or lower. The conductivity index $\kappa/\omega$ of the external additive for a toner is preferably $7.56\times10^{-14}$ (S/m)$\cdot$s or higher, and more preferably $9.02\times10^{-14}$ (S/m)$\cdot$s or higher. In a case where the conductivity index $\kappa/\omega$ is $6.44\times10^{-12}$ (S/m)$\cdot$s or lower, a certain amount of hydroxyl groups on the surface of the silica particles react with the polyhydric acid metal salt particles, to form metalloxane bonds, and a crosslinked body of the polyhydric acid and the titanium compound is formed, such that occurrence of charge-up is suppressed in the external additive for a toner, and charging performance stability increases. The conductivity index $\kappa/\omega$ can be controlled on the basis of the addition amount of the silica particles, the polyhydric acid, the titanium compound or the polyhydric acid metal salt particles. A measurement of the conductivity index $\kappa/\omega$ will be described further on.

Concerning the electrical characteristics of the external additive for a toner, preferably the relative dielectric constant is from 2.12 to 2.21, and the conductivity index $\kappa/\omega$ at a measurement frequency of 1 Hz ranges from $9.02\times10^{-14}$ (S/m)$\cdot$s to $4.51\times10^{-12}$ (S/m)$\cdot$s, or the volume resistivity at a measurement frequency of 0.021 Hz ranges from $2.19\times10^{12}$ ($\Omega\cdot$m) to $1.10\times10^{14}$ ($\Omega\cdot$m).

The silica particles having been surface-treated with the polyhydric acid metal salt particles may be further subjected to a surface treatment such as a hydrophobic treatment, as needed, so long as the characteristics of the external additive for a toner of the present disclosure are not impaired thereby. Examples of hydrophobic treatment agents include unmodified silicone varnishes, various modified silicone varnishes, unmodified silicone oil, various modified silicone oils, silane compounds, and silane coupling agents. These treatment agents may be used singly or in combination.

A toner that utilizes the external additive for a toner of the present disclosure will be explained next.

The toner of the present disclosure comprises a toner particle, and an external additive for a toner on the surface of the toner particle, wherein the external additive for a toner is the external additive for a toner of the present disclosure.

The toner particle may contain known binder resins, colorants waxes, and the like. The toner particle may contain as needed a charge control agent, in an amount such that the characteristics of the present invention are not impaired. An external additive other than the external additive of the present disclosure may be added to the toner particle.

The method for producing the toner particle is not particularly limited, and for instance, a production method such as pulverization, emulsification aggregation, suspension polymerization or dissolution suspension can be resorted to herein. Further, the external additive for a toner of the present disclosure can be externally added to the toner particle in accordance with a known production method. The weight-average particle diameter (D4) of the toner particle is preferably 4 to 12 μm, more preferably 5 to 8 μm.

Preferably, the toner produced using the external additive for a toner of the present disclosure has a volume resistivity at 0.021 Hz from $1.15\times10^{13}$ ($\Omega\cdot$m) to $1.00\times10^{14}$ ($\Omega\cdot$m), for the purpose of suppressing occurrence of charge-up and both of good developing performance and good transferability.

The binder resin is not particularly limited, so long as a toner particle can be formed. Illustrative examples include the following resin types: styrene resins, acrylic resins, methacrylic resins, styrene-acrylic resins, styrene-methacrylic resins, polyethylene resins, polyethylene-vinyl acetate resins, vinyl acetate resins, polybutadiene resins, phenolic resins, polyurethane resins, polybutyral resins, polyester resins, as well as hybrid resins in which the foregoing resins are arbitrarily bonded to each other.

Examples of the colorant include known organic pigments and dyes, carbon black and magnetic bodies. The pigment may be used singly; alternatively, a dye and a pigment may be used concomitantly.

Examples of coloring pigments for magenta include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:1, 48:2, 48:3, 48:4, 48:5, 49, 50, 51, 52, 53, 54, 55, 57:1, 58, 60, 63, 64, 68, 81:1, 81:2, 81:3, 81:4, 81:5, 83, 87, 88, 89, 90, 112, 114, 122, 123, 146, 147, 150, 163, 184, 185, 202, 206, 207, 209, 238, 269 and 282; C. I. Pigment Violet 19; and C. I. Vat Red 1, 2, 10, 13, 15, 23, 29 and 35.

Examples of coloring pigments for cyan include copper phthalocyanine compounds and derivatives thereof, anthraquinone compounds, and basic dye lakes compounds. Concrete examples include C. I. Pigment Blue 1, 7, 15, 15:1, 15:2, 15:3, 15:4, 60, 62 and 66.

Examples of coloring pigments for yellow include compounds such as a condensed azo compounds, isoindolinone compounds, anthraquinone compounds, azo metal complexes, methine compounds and allylamide compounds. Concrete examples include C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C. I. Vat Yellow 1, 3 and 20.

Examples of black colorants include carbon black, aniline black, acetylene black and titanium black; iron oxide; and colorants that are color-matched to black using a colorant for yellow, magenta or cyan.

The content of the colorant in the toner particle is not particularly limited, so long as the desired coloring effect can be achieved. For instance, the content of the colorant may be set to 3.0 parts by mass to 15.0 parts by mass relative to 100 parts by mass of the binder resin or polymerizable monomer.

Examples of the wax include petroleum-based waxes and derivatives thereof such as paraffin wax, microcrystalline wax and petrolatum; montan wax and derivatives thereof; hydrocarbon waxes and derivatives thereof obtained in accordance with the Fisher-Tropsch method; polyolefin waxes and derivatives thereof, typified by polyethylene; and natural waxes and derivatives thereof, such as carnauba wax and candelilla wax. The derivatives also include oxides, block copolymers with vinyl monomers, and graft-modified products. Further examples include alcohols such as higher aliphatic alcohols, fatty acids such as stearic acid and palmitic acid, acid amides and esters of compounds of the foregoing, hardened castor oil and derivatives thereof, as well as vegetable waxes and animal waxes. The wax can be used singly or in mixtures of two or more types. The content of the wax in the toner particle is preferably 2.5 parts by mass to 15.0 parts by mass relative to 100 parts by mass of the binder resin or the polymerizable monomer.

Known agents can be used as the charge control agent. Examples of charge control agents that control a toner particle so as to exhibit negative chargeability include polymer compounds having a sulfonic acid group, a sulfonic acid base or a sulfonic acid ester group; salicylic acid derivatives and metal complexes thereof; monoazo metal compounds; acetylacetone metal compounds; aromatic oxycarboxylic acids, aromatic monocarboxylic acids, or polycarboxylic acids, as well as metal salts, anhydrides and esters thereof; phenol derivatives such as bisphenol; urea derivatives; boron compounds; and calixarenes. The charge control agent for negative chargeability control can be used singly or in combinations of two or more types. Examples of the charge control agents that control a toner particle so as to exhibit positive chargeability include nigrosin and modified products thereof with a fatty acid metal salt; guanidine compounds; imidazole compounds; onium salts such as quaternary ammonium salts, for instance tributylbenzylammonium 1-hydroxy-4-naphtholsulfonate salt and tetrabutylammonium tetrafluoroborate, and analogues thereof, and phosphonium salts that are analogues of the foregoing, as well as lake pigments of the foregoing; triphenylmethane dyes and lake pigments thereof (examples of caking agents include phosphotungstic acid, phosphomolybdic acid, phosphotungstomolybdic acid, tannic acid, lauric acid, gallic acid, ferricyanide compounds and ferrocyanide compounds); metal salts of higher fatty acids; diorganotin oxides such as dibutyltin oxide, dioctyltin oxide and dicyclohexyltin oxide; and diorganotin borates, such as dibutyltin borate, dioctyltin borate and dicyclohexyltin borate. The charge control agent for positive chargeability control can be used singly or in combinations of two or more types. The content of the charge control agent in the toner particle is preferably from 0.1 parts by mass to 10.0 parts by mass, more preferably from 0.1 parts by mass to 5.0 parts by mass, relative to 100 parts by mass of the binder resin or the polymerizable monomer.

Methods for measuring the various physical properties of the external additive and the toner will be described next.

Relative Dielectric Constant and Volume Resistivity of External Additive and Toner The electrical characteristics of the external additive and the toner are evaluated by measuring the capacitance and electrical conductivity of air and a powder, on the basis of an impedance measurement relying on a parallel-plate capacitor method.

The equipment used is a powder measurement jig made up of a 4-terminal sample holder SH2-Z (by TOYO Corporation) and a torque wrench adapter SH-TRQ-AD (by TOYO Corporation, optional), and using also a material test system ModuLab XM MTS (by Solartron Analytical). There are further used a noise cutting transformer NCT-I3 1.4 kVA (by DENKENSEIKI Research Institute Co., Ltd.) for suppressing commercial power supply noise, and a shield box for suppressing electromagnetic noise.

A configuration is adopted in which the 4-terminal sample holder and the optional torque wrench adapter SH-TRQ-AD are used as the powder measurement jig, and an upper electrode (Φ25 mm solid electrode) SH-H25AU and a liquid/powder lower electrode (center electrode of Φ10 mm; guard electrode of Φ26 mm) SH-2610AU are used as parallel plate electrodes, with resistance of 0.1Ω to 1 TΩ being measured for an electrical signal having maximum of 500 Vp-p, DC to AC 1 MHz. In order to adjust the pressure on the powder sample, the torque wrench adapter SH-TRQ-AD is fitted to a micrometer used for film thickness measurement, between the upper and lower electrodes, provided in the 4-terminal sample holder. The torque driver used for controlling pressure is configured to enable controlling the tightening torque for a toner measurement at 6.5 cN·m and the tightening torque for the external additive to 20.0 cN·m, using a torque driver RTD15CN or RTD30CN (by Tohnichi Mfg. Co., Ltd.), and a 6.35 mm square bit.

Electrical AC characteristics were measured by performing an impedance measurement using a material test system ModuLab XM MTS (by Solartron Analytical). The ModuLab XM MTS is made up of a control module XM MAT 1 MHz, a high-voltage module XM MHV100, a femto-current module XM MFA and a frequency response analysis module XM MRA 1 MHz; the control software used herein is XM-studio MTS Ver. 3.4, by the same company.

Measurement conditions for a powder material exhibiting insulating properties, such as a toner, include Normal Mode for performing a measurement only; AC level of 7 Vrms, DC bias of 0 V, and sweep frequency of 1 MHz to 0.01 Hz (12 points/decade or 6 points/decade). In the case of a highly conductive powder material such as an external additive, the AC level is set within the range from $7\times10^{-3}$ Vrms to 7 Vrms, so as to lie in the measurable current range of the measuring instrument.

The following settings are added for each sweep frequency, with noise suppression and shortening of the measurement time in mind.

Sweep frequency of 1 MHz to 10 Hz: measurement integration time of 64 cycles

Sweep frequency of 10 Hz to 1 Hz: measurement integration time of 24 cycles

Sweep frequency of 1 Hz to 0.01 Hz: measurement integration time of 1 cycle

An impedance characteristic, which is an electrical AC characteristic, is measured under the above measurement conditions.

The impedance characteristic of air and the sample at a Φ10 mm measurement electrode S and film thickness d according to the pressing torque can be obtained performing the measurement under the above conditions, using a powder measurement jig based on to the parallel-plate capacitor method.

Data correction processing of the measurement system is performed on the basis of the obtained impedance characteristics of air and the sample, to obtain a capacitance C and conductance (conductivity) G with high reliability. Relative dielectric constant and electrical conductivity, which are electrical properties, are worked out on the basis of the obtained capacitance C and conductance (conductivity) and the geometrical shape of the powder measurement jig (parallel plate electrode size S and sample film thickness).

When using the 4-terminal sample holder SH2-Z for the first time, the following two verifications for finding out optimal measurement conditions must be carried out, given the individual differences in the 4-terminal sample holder SH2-Z that is used in the powder measurement jig. The first verification is a film thickness-dependence characteristic of the 4-terminal sample holder. An air thickness (distance between the upper and lower electrodes) dependence is measured, and the error between a theoretical value of capacitance and the measured value is checked, to grasp an optimal range or optimal value of film thickness for which measurement error is minimized. A second verification is a measurement of mechanical error. In a powder sample measurement, a torque-controlled load is applied, for the purpose of keeping volume density constant. By contrast, the air measurement is carried out in a load-less state. Herein a film thickness error occurs on account of dimensional influences such as mechanical machining precision. Therefore, an offset value of the tightening torque control value (6.5 cN·m in the present jig) in a loaded state and in a load-less state is checked, and the result is used as an offset correction value.

The concrete sample production and measurement procedures are as follows.

(1) A powder sample is placed at a central electrode portion of the lower electrode, and the sample is molded into a trapezoidal shape having a height of 5 mm.

(2) The lower electrode having the powder sample placed thereon is attached to the 4-terminal sample holder SH2-Z, and the upper electrode is lowered.

(3) The upper electrode is lowered, while being kept straight so as not to rotate improperly, down to the upper end of the powder sample.

(4) Smoothing process is performed, so that the powder sample is smoothed over, while causing the upper electrode to rotate left and right.

(5) The rotation direction of the upper electrode is kept uniformly in a given direction, using a micrometer, while film thickness is adjusted to a predetermined value.

(6) In the case of a toner, pressing is carried out using a torque driver the tightening torque of which is controlled to 6.5 cN·m. In the case of the external additive, pressing is carried out using a torque driver the tightening torque of which is controlled to 20.0 cN·m.

(7) The film thickness of the powder sample is measured using the micrometer.

(8) An impedance measurement is performed then under the conditions above.

(9) Once the measurement is over, the upper electrode is raised and the lower electrode is retrieved. Herein, the lower electrode is removed with great care, so as to prevent the powder sample from getting into a contact terminal for the lower electrode of the 4-terminal sample holder, and the retrieved lower electrode is protected then with masking tape.

(10) The upper and lower electrodes are cleaned.

(11) The masking tape is removed, and the lower electrode is attached.

(12) The sample film thickness d worked out in step (7) is adjusted, with load-less state offset correction, to be an air thickness t, and the rotation direction of the upper electrode is kept in a given uniform direction.

(13) The impedance of air is measured.

(14) In the case where the air measurement data (dielectric loss tangent; tan δ) measured in step (13) is larger than 0.001, in the frequency range of 100 Hz to 0.021 Hz, denotes herein insufficient cleaning, and accordingly the operation is performed again, from the cleaning step in step (10).

The measurement is carried out at 25° C.

The concrete data processing procedure is as follows.

(15) The error of a phase characteristic with respect to a theoretical value is calculated on the basis of the measured impedance characteristic of air, to obtain phase correction data of the material test system ModuLab XM MTS (by Solartron).

(16) The phase correction data calculated in step (15) is applied to the impedance characteristic of air measured in step (13), to obtain a phase-corrected impedance characteristic of air.

(17) The capacitance Ca is calculated and the error relative to the theoretical value is calculated, on the basis of the admittance Ya=Ga+jωCa of the phase-corrected air impedance characteristic, to obtain correction data α for the film thickness error.

(18) The phase correction process of step (15) is applied to the impedance characteristic of the powder sample as measured in step (8).

(19) A calculation is performed, using the capacitance Ca of air and the correction data α worked out in step (17), on complex admittance Ym=Gm+jωCm of the characteristic having undergone phase correction processing in step (18), as a result of which there are obtained the relative dielectric constant and electrical conductivity of the powder sample, with high reliability.

Methods for quantifying relative dielectric constant and volume resistivity, which are electrical properties, will be described below.

Method for Quantifying Relative Dielectric Constant

Figure 2:
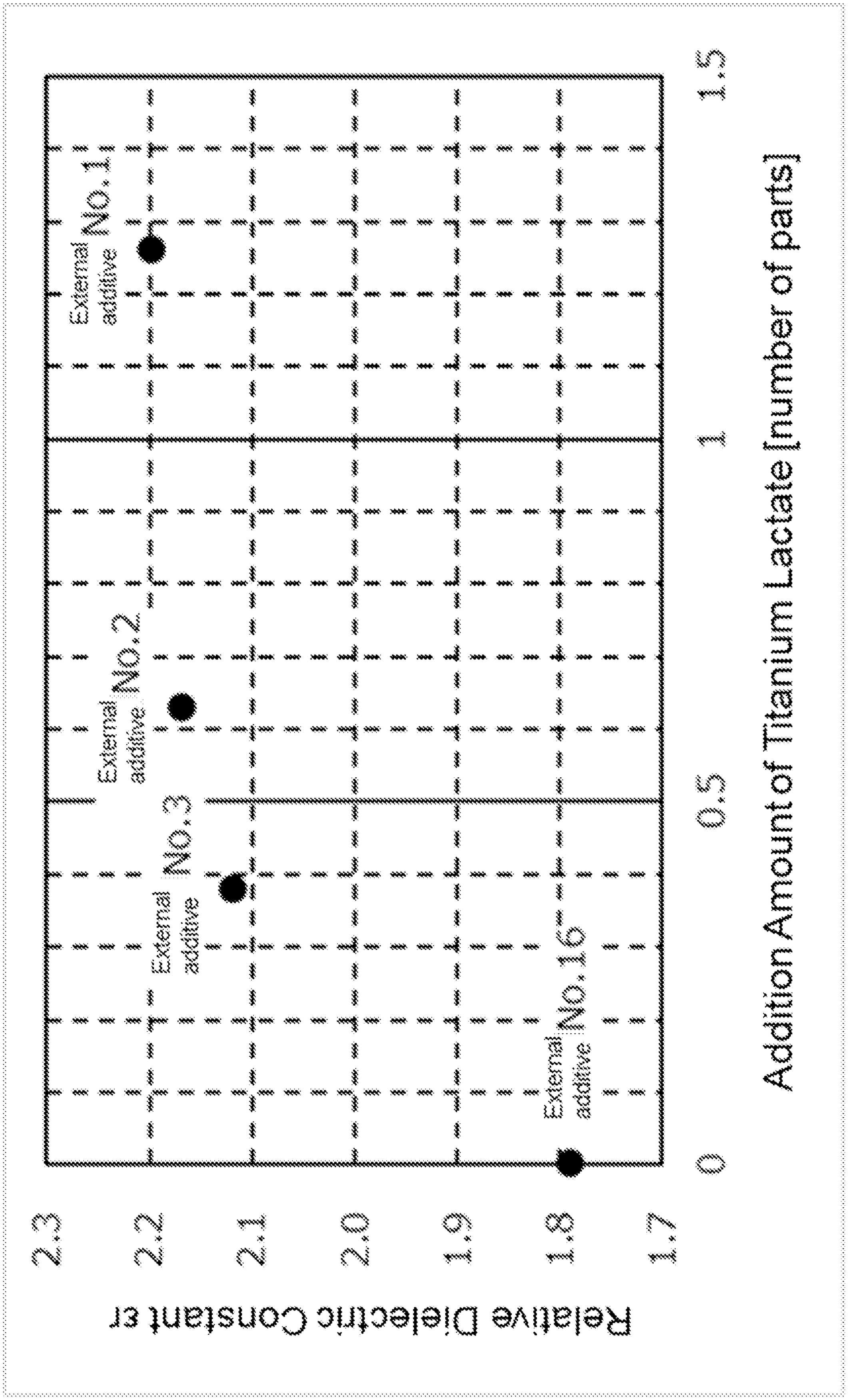
FIG. 2 is a diagram illustrating a relationship between the addition amount of titanium lactate and relative dielectric constant.

Relative dielectric constant is a factor pertaining to the charging characteristics of particles, such that an observed increase in relative dielectric constant can be a confirmation that silica particles have been surface-treated with polyhydric acid metal salt particles. In the external additive of the present disclosure, it is deemed that capacitance increases and relative dielectric constant becomes higher as a result of chemical adsorption of polyhydric acid metal salt particles onto hydroxyl groups present on the surface of the silica particles. Specifically, as illustrated in FIG. 2, the relative dielectric constant increases in accordance with the addition amount of titanium lactate which is a surface treatment agent, and a saturated characteristic is obtained (External additives 1, 2 and 3 in the below-described examples), as compared with untreated silica particles (External additive 16 in the examples below). A value of the relative dielectric constant at the frequency for which the measured dielectric loss tangent tan δ in a high frequency range is minimal is used herein as the relative dielectric constant denoting an orientation polarization component of the powder sample.

Method for Quantifying the Conductivity Index κ/ω

In general, the electrical conductivity κ of a dielectric (insulator) exhibits the property of being proportional to the angular frequency; accordingly, it is useful to use the conductivity index κ/ω, obtained by dividing the electrical conductivity κ by the angular frequency ω, as a conductivity parameter value. The conductivity index κ/ω denotes a frequency characteristic similar to the dielectric loss tangent tan δ, such that a characteristic having a maximum value can be obtained in a case where an electrode interface component and a powder bulk component exhibit different values of dielectric relaxation. The maximum value of the conductivity index κ/ω is found to denote the conductivity in a powder bulk including the interior of the particles, the surface of the particles, and (particle-particle) interfaces. Therefore, the above maximum value is defined as the conductivity parameter of the powder bulk component.

Figure 3:
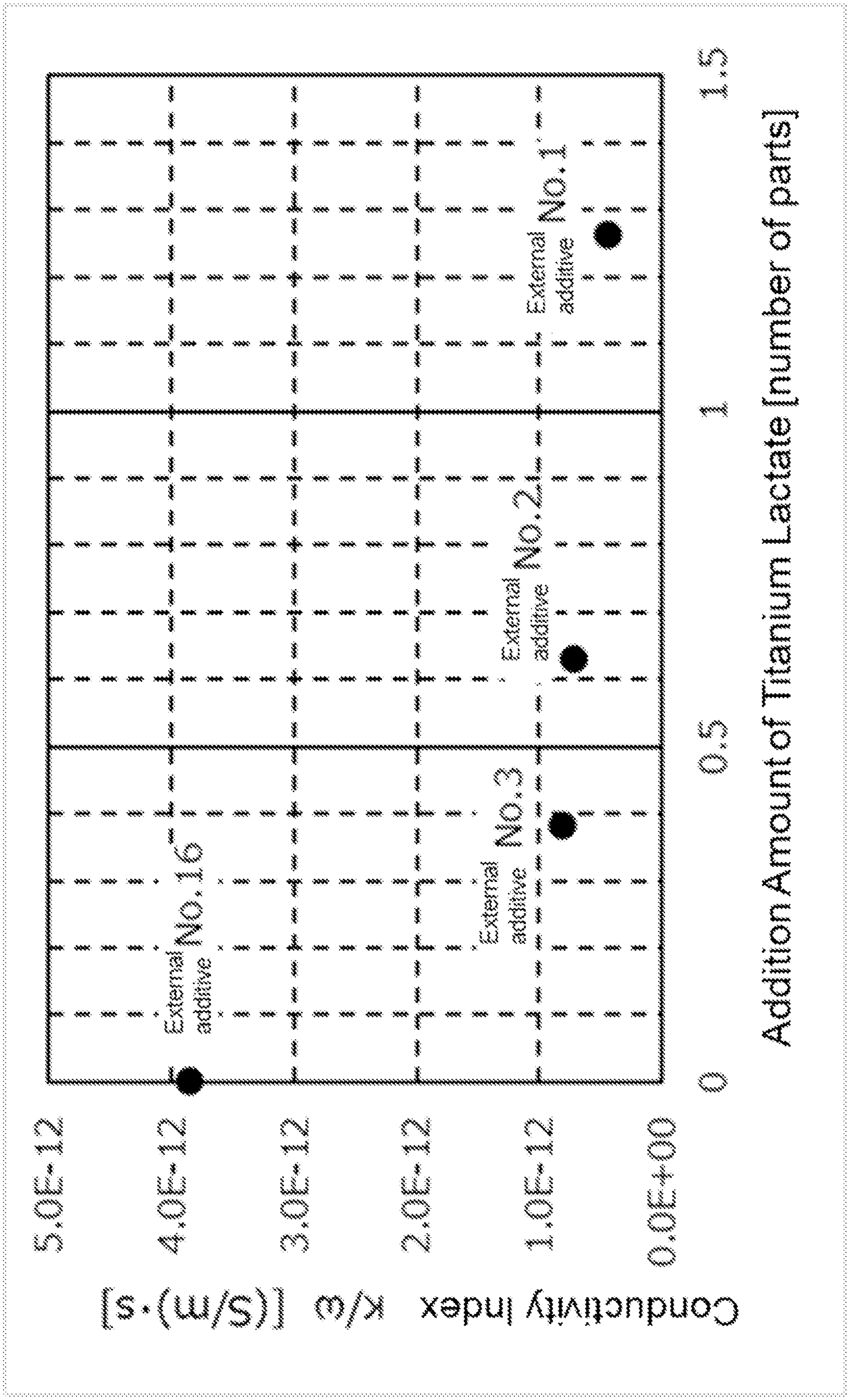
FIG. 3 is a diagram illustrating a relationship between the addition amount of titanium lactate and a conductivity index.

It is considered that conductivity is generated as a result of dissociation of hydroxyl groups present on the surface of the silica particles. Therefore, it is deemed that as a result of chemical adsorption of the surface treatment agent onto the hydroxyl groups, there decreases the number of dissociated hydroxyl groups, which are factors of conductivity, and conductivity likewise drops. Specifically, a characteristic is obtained whereby the conductivity index κ/ω decreases in accordance with the addition amount of the titanium lactate, which is one component of the surface treatment agent, as illustrated in FIG. 3, such that the particles (External additives 1, 2 and 3) exhibit characteristics similar to those of general hydrophobic treatments, as compared with untreated silica particles (External additive 16). Further, the frequency characteristic at which a maximum value of the conductivity index κ/ω of External additives 1, 2 and 3 was obtained was herein 1 Hz, and accordingly a value at 1 Hz is used as the conductivity index κ/ω of the external additive.

Method for Quantifying Electrical Conductivity and Volume Resistivity

A powder sample having both capacitance and conductivity can be regarded as an RC parallel circuit model, such that the electrical conductivity κ in a low frequency range exhibits a constant value. Volume resistivity is defined as the reciprocal of the electrical conductivity κ.

The powder sample of the dielectric (insulator) lies outside the measurable range of the measuring device, and accordingly it is difficult to work out the true volume resistivity. In consequence, there is used the electrical conductivity κ at a measurement frequency of 0.021 Hz, which allows guaranteeing the accuracy of the measuring device, with volume resistivity (f=0.021 Hz) being defined as the reciprocal of that electrical conductivity κ.

Method for Detecting Polyhydric Acid Metal Salt Particles

The polyhydric acid metal salt particles present on the surface of silica particles are detected in accordance with the method below, by time-of-flight secondary ion mass spectrometry (TOF-SIMS).

An external additive sample is analyzed by TOF-SIMS (TRIFTIV: by Ulvac-Phi, Inc.) under the following conditions.

Primary ion species: gold ions ($Au^+$)

Primary ion current value: 2 pA

Analysis area: 300×300 $\mu m^2$

Number of pixels: 256 pixels×256 pixels

Analysis time: 3 min

Repeat frequency: 8.2 kHz

Charge neutralization: ON

Secondary ion polarity: positive

Secondary ion mass range: m/z of 0.5 to 1850

Sample substrate: indium

The polyhydric acid metal salt particles present on the surface of silica particles are identified on the basis of peaks obtained in the above analysis. Polyhydric acid metal salt particles are present on the surface of the silica particles in a case where peaks are detected that derive from secondary ions that include metal ions and polyhydric acid ions (for instance, $TiPO_3$ (m/z 127) and $TiP_2O_5$ (m/z 207) in the case of a salt of phosphoric acid and a titanium compound).

Method for Measuring the Content of Polyhydric Acid Metal Salt Particles Relative to Silica Particles The content of the polyhydric acid metal salt particles relative to the silica particles is calculated on the basis of an X-ray fluorescence measurement. The X-ray fluorescence measurement of various elements conforms to JIS K 0119-1969, and is specifically as follows. The measuring device utilized herein is a wavelength-dispersive X-ray fluorescence analyzer "Axios" (by PANalytical B. V.), with ancillary dedicated software "SuperQ Ver. 4.0F" (by PANalytical B. V) for setting measurement conditions and analyzing measurement data. Rhodium (Rh) is used as the anode of the X-ray tube bulb, the measurement atmosphere is vacuum, the measurement diameter (collimator mask diameter) is set to 27 mm, and the measurement time to 10 seconds. Detection is carried out using a proportional counter (PC) to measure light elements, and using a scintillation counter (SC) to measure heavy elements.

Herein 4.0 g of toner are placed in a dedicated aluminum ring for pressing, and the toner is smoothed over; then a measurement sample is obtained in the form of a pellet shaped to a thickness of 2 mm and a diameter of 39 mm through pressing for 60 seconds at 20 MPa using a tablet compression molder "BRE-32" (by Maekawa Testing Machine Mfg. Co. Ltd.). The measurement is carried out under the above conditions, whereupon elements are identified on the basis of the obtained X-ray peak positions; the concentration is calculated from a count rate (units: cps), which is the number of X-ray photons per unit time.

Method for Measuring the Number-Average Particle Diameter of Silica Particles and External Additive Particles The particle size distributions of the silica particles and the external additive particles are measured using a dynamic light scattering-type particle size distribution meter Nanotrac UPA-EX150 (by Nikkiso Co., Ltd.) according to the operation manual of the device. Specifically, the measurement sample is adjusted so that transmittance lies in a measurable range (70% to 95%) in a sample introduction part of the measuring device, whereupon there is measured a particle diameter (median diameter) corresponding to a number distribution-basis cumulative value of 50%.

Method for Measuring the BET Specific Surface Area of Core Particles

The BET specific surface area of core particles such as silica particles can be worked out by low-temperature gas adsorption relying on a dynamic constant pressure method, in accordance with the BET method (preferably a multi-point BET method). For example, nitrogen gas is caused to be adsorbed onto the sample surface, using a specific surface area measuring device (Gemini 2375 Ver. 5.0, by Shimadzu Corporation), and a measurement is then performed in accordance with a multi-point BET method, to thereby calculate a BET specific surface area ($m^2/g$). Specifically, the measurement is performed in accordance with the procedure below.

The mass of an empty sample cell is measured, and thereafter the sample cell is filled with the measurement sample, to about 80% of the cell volume. The sample cell filled with the sample is set in a degassing device, and the sample is degassed at room temperature for 7 hours. After degassing, the mass of the entire sample cell is measured, and the exact mass of the sample is calculated on the basis of the difference with respect to the empty sample cell. The empty sample cell is then set in in the balance port and analysis port of the BET measuring device. Then a Dewar bottle containing liquid nitrogen is set at a predetermined position, and a saturated vapor pressure (P0) is measured through a P0 measurement command. Once the P0 measurement is over, the degassed sample cell is set in the analysis port, the sample mass and P0 are inputted, and then the measurement is initiated through a BET measurement command. The BET specific surface area is automatically calculated thereafter.

Method for Measuring the Weight-Average Particle Diameter (D4) of a Toner Particle The weight average particle diameter (D4) of the toner (or the toner particle) are measured at the number of effective measurement channels of 25,000 by using a precision particle size distribution measuring device "Coulter Counter Multisizer 3" (registered trademark, manufactured by Beckman-Coulter Inc.) which is based on the pore electrical resistivity method and equipped with a 100-μm aperture tube and dedicated software "Beckman Coulter Multisizer 3 Version 3.51" (produced by Beckman-Coulter Inc.) for setting measurement conditions and analyzing measurement data, the measurement data is analyzed and calculations are performed. An electrolytic aqueous solution to be used for the measurement can be prepared by dissolving special grade sodium chloride in ion-exchanged water so that the concentration becomes about 1% by mass. For example, "ISOTON II" (manufactured by Beckman-Coulter Inc.) can be used.

Before performing the measurement and analysis, the dedicated software is set as follows. On a "Change standard measurement method (SOM) screen" of the dedicated software, the total count number in the control mode is set to 50000 particles, the number of measurement cycles to 1, and a Kd value to a value obtained using "standard particles 10.0 μm" (manufactured by Beckman-Coulter Inc.). By pressing a threshold/noise level measurement button, the threshold and noise level are automatically set. Further, the current is set to 1600 μA, the gain to 2, and the electrolyte solution to ISOTON II, and the flush of the aperture tube after measurement is checked. On the "Pulse to particle diameter conversion setting screen" of the dedicated software, a bin spacing is set to a logarithmic particle diameter, a particle diameter bin to 256 particle diameter bin, and the particle diameter range from 2 μm to 60 μm.

The specific measurement method is as follows.

(1) About 200 ml of the electrolytic aqueous solution is put in a glass 250 ml round bottom beaker provided with the Multisizer 3, the beaker is set on the sample stand, and counterclockwise stirring with the stirrer rod is performed at 24 revolutions/sec. Then, dirt and air bubbles in the aperture tube are removed by the "Flush of the aperture tube" function of the dedicated software.

(2) About 30 ml of the electrolytic aqueous solution is placed in a 100 ml flat-bottomed beaker made of glass, and about 0.3 ml of a diluted solution prepared by threefold mass dilution of "Contaminone N" (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) with ion-exchanged water is added as a dispersant thereto.

(3) A predetermined amount of ion-exchanged water is put in a water tank of an ultrasonic disperser "Ultrasonic Dispersion System Tetora 150" (manufactured by Nikkaki Bios Co., Ltd.) in which two oscillators with an oscillation frequency of 50 kHz are built in with a phase shifted by 180 degrees and which has an electrical output of 120 W, and about 2 ml of the Contaminone N is added to the water tank.

(4) The beaker of (2) is set into a fixing hole of the ultrasonic disperser, and the ultrasonic disperser is operated. The height position of the beaker is adjusted so that the resonance state of the liquid level of the electrolytic solution in the beaker is maximized.

(5) With the electrolytic aqueous solution in the beaker of (4) irradiated with ultrasonic waves, about 10 mg of toner (or toner particle) is added little by little to the electrolytic aqueous solution and dispersed. Then, the ultrasonic dispersion processing is continued for another 60 sec. In the ultrasonic dispersion, the water temperature in the water tank is adjusted, as appropriate, to be from 10° C. to 40° C.

(6) The electrolytic aqueous solution of (5) in which the toner was dispersed is added dropwise by using a pipette to the round-bottomed beaker of (1) that was installed in the sample stand, and the measurement concentration is adjusted to about 5%. Then, the measurement is performed until the number of measured particles reaches 50,000.

(7) The measurement data is analyzed with the dedicated software provided with the device, and the weight average particle diameter (D4) is calculated. The "average diameter" on the analysis/volume statistics (arithmetic mean) screen when graph/volume % is set with the dedicated software is the weight average particle diameter (D4).

Method for Identifying Polyhydric Acid Metal Salt Particles on the Surface of Silica Particles Scanning electron microscopy (SEM, TEM) allows herein identifying that the silica particles of the external additive have been surface-treated with a particulate polyhydric acid metal salt. Observation by TEM is performed in accordance with the following procedure.

A cross section of silica particles is observed, in accordance with the method below, using a transmission electron microscope (TEM).

Firstly, silica particles are sufficiently dispersed in a normal-temperature-curable epoxy resin, after which the silica particles are cured for 2 days in the atmosphere at 40° C. A flaky sample having a thickness of 50 nm is cut out from the obtained cured product, using a microtome (EMUC: by Leica Camera AG) equipped with a diamond blade. This sample is magnified using a TEM (JEM2800 model: by JEOL Ltd.) to 500,000 magnifications under conditions that include an acceleration voltage of 200 V and an electron probe size of 1 mm, and a cross section of the silica particles is observed. Herein there is selected a cross section of silica particles having a maximum diameter of 0.9 times to 1.1 times of the number-average particle diameter at the time of a measurement in accordance with the method for measuring the number-average particle diameter of the silica particles. It can then be checked that polyhydric acid metal salt particles are present on the surface of the silica particles. Furthermore, the cross-sectional area of the identified polyhydric acid metal salt particles (primary particles) is measured and the circle equivalent diameter is calculated. The same process is performed for 100 or more particles, and the number average diameter of the primary particles is calculated.

Next, the constituent elements of the obtained cross section are analyzed by energy dispersive X-ray spectroscopy (EDX), to create an EDX mapping image (256 pixels× 256 pixels; 2.2 nm/pixel; 200 scans). In the created EDX mapping image, there can be observed signals such as silicon within the silica particles, and phosphorus and titanium derived from the polyhydric acid metal salt elements on the surface of the silica particles. The presence of a reaction product of the polyhydric acid and a compound containing a group 4 element can be determined through analysis by time-of-flight secondary ion mass spectrometry (TOF-SIMS analysis) described above.

Separation of External Additive from the Toner

Separation of the external additive from the toner is accomplished in accordance with the method below.

Herein 1 g of toner is weighed, and is dispersed in 100 ml of water having added thereto 1 mg of "Contaminon N" (10 mass % aqueous solution of a pH-7 neutral detergent for cleaning precision measuring instruments, made up of a nonionic surfactant, an anionic surfactant and an organic builder, by Wako Pure Chemical Industries). The resulting dispersion is irradiated with ultrasounds, is treated in a centrifuge at a predetermined strength, and the obtained supernatant is dried, to thereby separate just the external additive alone.

EXAMPLES

The present disclosure will be described in more detail next with reference to production examples and examples, but these examples are not meant to limit the present disclosure in any way. As used in the examples, the language "parts" refers to parts by mass in all instances.

Production Example of Silica Particles 1

Herein 500 parts of methanol and 70 parts of 10 mass % aqueous ammonia were added into a 1.5 L glass reaction vessel equipped with a stirrer, a dropwise addition nozzle and a thermometer, with mixing of the whole, to yield an alkaline catalyst solution. The alkaline catalyst solution was adjusted to 30° C., and thereafter 100 parts of tetramethoxysilane (TMOS) and 20 parts of 8.0 mass % aqueous ammonia were simultaneously added dropwise over 60 minutes, while under stirring, to yield a hydrophilic spherical silica particle dispersion. The obtained spherical silica particle dispersion was filtered, washed, and dried, to yield Silica particles 1, which are sol-gel silica particles. The number-average particle diameter of the obtained Silica particles 1 was 100 nm.

Production Examples of Silica Particles 2 to 9

Silica particles 2 to 9, which are sol-gel silica particles, were produced in the same way as in the production example of Silica particles 1 except that the adjustment temperature and addition amount of the alkali catalyst solution and the dropwise addition time of tetramethoxysilane were modified as appropriate. The physical properties of the obtained Silica particles 2 to 9 are given in Table 1.

Silica Particles 10 and 11

Dry silica particles having a particle diameter of 7 nm (AEROSIL (registered trademark) 300, by Nippon Aerosil Co., Ltd.) were prepared as Silica particles 10, and dry silica particles having a particle diameter of 600 nm (SO-E2 by Admatechs Co., Ltd.) were prepared as Silica particles 11. Table 1 sets out the physical properties of Silica particles 10 and 11.

Table 1

TABLE 1

| Silica particle No. | Number-average particle diameter (nm) | Silica particle specific surface area ($m^2/g$) | Production method | Surface treatment | Product name | Manufacturer |
|---|---|---|---|---|---|---|
| 1 | 100 | 29.0 | Wet type | None | — | — |
| 2 | 10 | 210.5 | Wet type | None | — | — |
| 3 | 30 | 81.7 | Wet type | None | — | — |
| 4 | 50 | 52.6 | Wet type | None | — | — |
| 5 | 70 | 39.4 | Wet type | None | — | — |
| 6 | 200 | 16.0 | Wet type | None | — | — |
| 7 | 300 | 11.3 | Wet type | None | — | — |
| 8 | 400 | 8.8 | Wet type | None | — | — |

TABLE 1-continued

| Silica particle No. | Number-average particle diameter (nm) | Silica particle specific surface area ($m^2/g$) | Production method | Surface treatment | Product name | Manufacturer |
|---|---|---|---|---|---|---|
| 9 | 500 | 7.3 | Wet type | None | — | — |
| 10 | 7 | 286.1 | Dry type | None | AEROSIL (TM) 300 | Nippon Aerosil Co., Ltd. |
| 11 | 600 | 6.2 | Dry type | None | SO-E2 | Admatechs Co., Ltd. |

Production Example of External Additive 1

Ion-exchanged water 100.0 parts

Sodium phosphate (dodecahydrate) (by RASA Industries, Ltd.) 8.5 parts

The above components were mixed to produce an aqueous solution of phosphoric acid. Next, 63.0 parts of the aqueous solution of phosphoric acid and 7.0 parts of Silica particles 1 were added into a reaction vessel, and the whole was stirred at 12,000 rpm using T. K. Homomixer (by Tokushu Kika Kogyo Co., Ltd.), at 55° C., with further addition of 13.8 parts of a 44% aqueous solution of titanium lactate (TC-310: by Matsumoto Fine Chemical Co., Ltd.). Thereafter the pH was adjusted to 9.5 using a 1.0 mol/L NaOH aqueous solution while under mixing using a propeller stirring blade, and the temperature was held as it was, at 55° C., for 3 hours while under stirring.

The temperature was lowered to 25° C., and thereafter a solid fraction was retrieved by centrifugation. Thereafter, a process of re-dispersion in ion-exchanged water and retrieval of a solid fraction by centrifugation was repeated thrice, to remove ions such as sodium. The solid fraction was dispersed again in ion-exchanged water and was dried by spray-drying, to yield silica particles coated with particles of a salt of phosphoric acid and a titanium compound. This was used as External additive 1. The result of time-of-flight secondary ion mass spectrometry (TOF-SIMS) performed on External additive 1 revealed peaks derived from a salt of phosphoric acid and a titanium compound. The content of particles of the salt of phosphoric acid and a titanium compound was calculated by X-ray fluorescence. Table 2 sets out other physical properties. The frequency at which a maximum value of the conductivity index κ/ω of External additive 1 was obtained was herein 1 Hz.

Production Examples of External Additives 2 to 11

External additives 2 to 11 were obtained in the same way as in the production example of External additive 1 except that the type of the silica particles and the addition amount of titanium lactate in the production example of External additive 1 were modified as given in Table 2. In all the obtained External additives 2 to 11, there were observed peaks derived from a salt of phosphoric acid and a titanium compound. Table 2 sets out other physical properties.

The frequency at which a maximum value of the conductivity index κ/ω of External additives 2 and 3 was obtained was herein 1 Hz.

Production Example of External Additive 12

External additive 12 was obtained in the same way as in production example of External additive 1 except that Silica particles 11 were used, and the addition amount of titanium lactate was modified to the amount given in Table 2. In the obtained External additive 12, there were observed peaks derived from a salt of phosphoric acid and a titanium compound. Table 2 sets out other physical properties.

Production Example of External Additive 13

External additive 13 was obtained in the same way as in production example of External additive 1 except that Silica particles 10 were used, and the addition amount of titanium lactate was modified to the amount given in Table 2. In the obtained External additive 13, there were observed peaks derived from a salt of phosphoric acid and a titanium compound. Table 2 sets out other physical properties.

Production Example of External Additive 14

External additive 14 was obtained in the same way as in the production example of External additive 1 except that sodium phosphate in the production example of External additive 1 was modified to sodium carbonate. In the obtained External additive 14, there were observed peaks derived from a titanium carbonate compound. Table 2 sets out other physical properties.

Production Example of External Additive 15

External additive 15 was obtained in the same way as in the production example of External additive 1 except that sodium phosphate in the production example of External additive 1 was modified to sodium sulfate. In the obtained External additive 15, there were observed peaks derived from a titanium sulfate compound. Table 2 sets out other physical properties.

External Additive 16

Silica particles 1 were used as External additive 16.

Production Example of External Additive 17

Ilmenite ore containing 50 mass % of $TiO_2$ was used as a starting material. This starting material was dried at 150° C. for 2 hours, followed by dissolution through addition of sulfuric acid, to yield as a result an aqueous solution of $TiOSO_4$. This aqueous solution of $TiOSO_4$ was concentrated, and then 4.5 parts by mass of titania sol having rutile crystals were added as a seed, after which hydrolysis was carried out at 110° C., to yield a slurry of $TiO(OH)_2$ containing an impurity. The slurry was repeatedly washed with water at a pH 5 to 6, to sufficiently remove sulfuric acid, $FeSO_4$, and impurities. A slurry of high-purity metatitanic acid [$TiO(OH)_2$] was thus obtained. This slurry was filtered and was baked at 180° C. for 2 hours, followed by repeated deagglomeration using a jet mill, until no aggregates of fine particles were left. This titanium oxide was dispersed in ethanol, and then 4.6 mass % of isobutyltrimethoxysilane and 4.6 mass % of trifluoropropyltrimethoxysilane were added dropwise and mixed, relative to 100 parts by mass of titanium oxide solids, to elicit a reaction, while under sufficient stirring so as to preclude coalescing of particles. The pH of the slurry was adjusted to 6.5 while under sufficient stirring. The slurry was then filtered and dried, and was then heat-treated at 170° C. for 2 hours, followed by repeated deagglomeration using a jet mill, until no aggregates of titanium oxide were left. This was used as External additive 17. Table 2 sets out the physical properties of the obtained External additive 17.

Production Example of External Additive 18

Ilmenite ore containing 50 mass % of $TiO_2$ was used as a starting material. This starting material was dried at 150° C. for 2 hours, followed by dissolution through addition of sulfuric acid, to yield as a result an aqueous solution of $TiOSO_4$. This aqueous solution of $TiOSO_4$ was concentrated, and then 4.5 parts by mass of titania sol having rutile crystals were added as a seed, after which hydrolysis was carried out at 110° C. to yield a slurry of $TiO(OH)_2$ containing an impurity. The slurry was repeatedly washed with water at a pH 5 to 6, to sufficiently remove sulfuric acid, $FeSO_4$, and impurities. A slurry of high-purity metatitanic acid [$TiO(OH)_2$] was thus obtained. This slurry was filtered and was baked at 180° C. for 2 hours, followed by repeated deagglomeration using a jet mill until no aggregates of fine particles were left, and yield as a result titanium oxide core particles. A measurement of the BET specific surface area of the titanium oxide core particles revealed a result of 75.3 $m^2/g$.

The components below were mixed, to produce an aqueous solution of phosphoric acid.

Ion-exchanged water 100.0 parts

Sodium phosphate (dodecahydrate) (by RASA Industries, Ltd.) 8.5 parts

Next, 63.0 parts of the aqueous solution of phosphoric acid and 7.0 parts of titanium oxide core particles were added into a reaction vessel, and the whole was stirred at 12,000 rpm using T. K. Homomixer (by Tokushu Kika Kogyo Co., Ltd.), at 55° C., with further addition of 3.27 parts of a 44% aqueous solution of titanium lactate (TC-310: by Matsumoto Fine Chemical Co., Ltd.). Thereafter the pH was adjusted to 9.5 using a 1.0 mol/L NaOH aqueous solution while under mixing using a propeller stirring blade, and then the temperature was held as it was, at 55° C., for 3 hours while under stirring. The temperature was lowered to 25° C., and thereafter the solid fraction was retrieved by centrifugation. Thereafter, a process of re-dispersion in ion-exchanged water and retrieval of the solid fraction by centrifugation was repeated thrice, to remove ions such as sodium. The product was dispersed again in ion-exchanged water, and was dried by spray-drying, to yield titanium oxide particles coated with particles of a salt of phosphoric acid and a titanium compound. These coated titanium oxide particles was used as External additive 18. The result of time-of-flight secondary ion mass spectrometry (TOF-SIMS) performed on External additive 18 revealed peaks derived from a salt of phosphoric acid and a titanium compound. Table 2 sets out other physical properties.

Production Example of External Additive 19

Herein 100 parts by mass of a dry silica powder having a volume median diameter (D50) of 80 nm, obtained by vapor phase synthesis, and 25 parts by mass of a titania powder having a volume median diameter (D50) of 15 nm (AEROXIDE (registered trademark) NKT90, by Nippon Aerosil Co., Ltd.) were mixed for 30 seconds under conditions of a rotational speed of 600 rpm, using a pin mill ("Sample Mill SAM-0 model" by Nara Machinery Co., Ltd.). As a result, there were obtained silica-titania composite particles in which multiple titania particles (externally added titania particles) were adhered to the surface of respective silica particles contained in the silica powder. These silica-titania composite particles was used as External additive 19. Table 2 sets out the physical properties of External additive 19.

[Table 2]

TABLE 2

| External additive No. | Core type | Silica particle No. | BET specific surface area ($m^2/g$) of core particles | Surface treatment | Titanium lactate addition amount (parts) | Number-average particle diameter (nm) | Content of polyhydric acid titanium salt particles (%) | Relative dielectric constant $\epsilon r$ | Conductivity index κ/ω at f = 1 Hz (S/m) · s | Volume resistivity at f = 0.021 Hz 1/k (Ω · m) | Volume resistivity 1/k (Ω · m) |
|---|---|---|---|---|---|---|---|---|---|---|---|
| 1 | Silica | 1 | 29.0 | Titanium phosphate | 13.8 | 2.2 | 0.15 | 2.20 | $4.51 \times 10^{-13}$ | $2.19 \times 10^{13}$ | — |
| 2 | Silica | 1 | 29.0 | Titanium phosphate | 6.9 | 2.1 | 0.08 | 2.17 | $7.28 \times 10^{-13}$ | $8.00 \times 10^{12}$ | — |
| 3 | Silica | 1 | 29.0 | Titanium phosphate | 4.6 | 2.2 | 0.05 | 2.12 | $8.18 \times 10^{-13}$ | $6.29 \times 10^{12}$ | — |
| 4 | Silica | 2 | 210.5 | Titanium phosphate | 99.9 | 2.2 | 0.15 | 2.20 | $4.51 \times 10^{-12}$ | $2.19 \times 10^{12}$ | — |
| 5 | Silica | 3 | 81.7 | Titanium phosphate | 38.8 | 2.2 | 0.15 | 2.20 | $1.50 \times 10^{-12}$ | $6.58 \times 10^{12}$ | — |
| 6 | Silica | 4 | 52.6 | Titanium phosphate | 25.0 | 2.1 | 0.15 | 2.20 | $9.02 \times 10^{-13}$ | $1.10 \times 10^{13}$ | — |
| 7 | Silica | 5 | 39.4 | Titanium phosphate | 18.7 | 2.1 | 0.15 | 2.20 | $6.44 \times 10^{-13}$ | $1.54 \times 10^{13}$ | — |
| 8 | Silica | 6 | 16.0 | Titanium phosphate | 7.6 | 2.0 | 0.15 | 2.20 | $2.26 \times 10^{-13}$ | $4.39 \times 10^{13}$ | — |
| 9 | Silica | 7 | 11.3 | Titanium phosphate | 5.4 | 2.0 | 0.15 | 2.20 | $1.50 \times 10^{-13}$ | $6.58 \times 10^{13}$ | — |
| 10 | Silica | 8 | 8.8 | Titanium phosphate | 4.2 | 2.0 | 0.15 | 2.20 | $1.13 \times 10^{-13}$ | $8.77 \times 10^{13}$ | — |
| 11 | Silica | 9 | 7.3 | Titanium phosphate | 3.5 | 2.0 | 0.15 | 2.20 | $9.02 \times 10^{-14}$ | $1.10 \times 10^{14}$ | — |
| 12 | Silica | 11 | 6.2 | Titanium phosphate | 2.9 | 2.1 | 0.15 | 2.19 | $7.56 \times 10^{-14}$ | $1.32 \times 10^{14}$ | — |
| 13 | Silica | 10 | 286.1 | Titanium phosphate | 135.7 | 2.2 | 0.15 | 2.21 | $6.44 \times 10^{-12}$ | $1.54 \times 10^{12}$ | — |
| 14 | Silica | 1 | 29.0 | Titanium carbonate | 13.8 | 2.2 | 0.15 | 2.20 | $6.37 \times 10^{-13}$ | $1.41 \times 10^{13}$ | — |
| 15 | Silica | 1 | 29.0 | Titanium carbonate | 13.8 | 2.3 | 0.15 | 2.19 | $7.82 \times 10^{-13}$ | $3.79 \times 10^{13}$ | — |
| 16 | Silica | 1 | 29.0 | None | — | — | — | 1.79 | $3.86 \times 10^{-12}$ | $1.69 \times 10^{11}$ | — |
| 17 | Titania | — | — | None | — | — | — | 5.00 | $8.99 \times 10^{-10}$ | — | $1.74 \times 10^{8}$ |
| 18 | Titania | — | 75.3 | Titanium phosphate | 35.7 | 2.3 | 0.15 | Not identifiable | Not identifiable | — | $6.51 \times 10^{3}$ |

TABLE 2-continued

| External additive No. | Core type | Silica particle No. | BET specific surface area ($m^2/g$) of core particles | Surface treatment | Titanium lactate addition amount (parts) | Number-average particle diameter (nm) | Content of polyhydric acid titanium salt particles (%) | Relative dielectric constant ∈r | Conductivity index κ/ω at f = 1 Hz (S/m) · s | Volume resistivity at f = 0.021 Hz 1/k (Ω · m) | Volume resistivity 1/k (Ω · m) |
|---|---|---|---|---|---|---|---|---|---|---|---|
| 19 | Silica | — | — | Titania adhesion | — | — | — | 1.87 | $2.48 \times 10^{-11}$ | — | $1.31 \times 10^{10}$ |

In the table, Number-average particle diameter (nm) denotes the number-average particle diameter of the primary particles of the polyhydric acid metal salt particles.

It is deemed that, in the external additive of the present disclosure, the polyhydric acid metal salt particles which are a surface treatment agent become chemically adsorbed onto the surface of untreated silica particles, and at least, a reaction occurs between part of the polyhydric acid metal salt particles and the surface of the untreated silica particles, and bonds form therebetween. This occurrence is hinted at by changes in relative dielectric constant and conductivity, which are electrical properties. The results are illustrated in FIG. 1.

FIG. 2 illustrates the addition amount dependence of a surface treatment agent (titanium lactate) with respect to relative dielectric constant, in External additives 1 to 3 and 16; this dependence will be explained below.

FIG. 2 reveals that capacitance contributing to charging characteristics is improved, and relative dielectric constant increased, by virtue of the fact that the polyhydric acid metal salt particles become chemically adsorbed to the hydroxyl groups present on the surface of External additive 16 (untreated silica particles). It was found that relative dielectric constant increases with the addition amount of titanium lactate, until saturated.

FIG. 3 illustrates the addition amount dependence of a surface treatment agent (titanium lactate) with respect to conductivity, in External additives 1 to 3 and 16; this dependence will be explained below.

The number of dissociated hydroxyl groups which are factors of conductivity decreases, and also conductivity drops, by virtue of the fact that the polyhydric acid metal salt particles become chemically adsorbed to the hydroxyl groups present on the surface of External additive 16 (untreated silica particles).

The electrical conductivity κ of titanium phosphate and titanium trioxide produced by Mitsuwa Chemicals Co., Ltd. was $1.27 \times 10^{-4}$ and $9.80 \times 10^{-6}$ ((S/m)·s). Polyhydric acid metal salt particles ordinarily exhibit thus high conductivity. Given the electrical conductivity of the external additive for a toner of the present disclosure, it is considered that the polyhydric acid metal salt particles are not simply adhered to the silica particles, but at least part of the polyhydric acid metal salt particles reacts with the surface of the silica particles.

Production Example of Toner Particle 1

Preparation Example of a Polymerizable Monomer Composition

The composition below was mixed, followed by dispersion for 3 hours in a ball mill.

| | |
|---|---|
| Styrene | 82.0 parts |
| 2-ethylhexyl acrylate | 18.0 parts |
| Divinylbenzene | 0.1 part |

-continued

| | |
|---|---|
| C. I. Pigment Blue 15:3 | 5.5 parts |
| Polyester resin | 5.0 parts |

[polycondensate of propylene oxide-modified bisphenol A and isophthalic acid (glass transition temperature of 65° C., weight-average molecular weight (Mw) of 10000, number-average molecular weight (Mn) of 6000)]

The obtained dispersion was heated at 60° C. while under stirring at 300 rpm, followed by addition of 12.0 parts of an ester wax (having a peak temperature of a maximum endothermic peak by differential scanning calorimetry of 70° C., and having a number-average molecular weight (Mn) of 704) and 3.0 parts of 2,2'-azobis(2,4-dimethylvaleronitrile), with dissolution, to yield a polymerizable monomer composition.

Preparation Example of an Aqueous Dispersion Medium

Herein 710 parts of ion-exchanged water and 450 parts of an 0.1 mol/L aqueous solution of sodium phosphate were added to a 2 L four-necked flask having a high-speed stirring device T. K. Homomixer (by Primix Corporation) attached thereto, and the whole was heated at 60° C. while under stirring at 12000 rpm. Then 68.0 parts of a 1.0 mol/L aqueous solution of calcium chloride was gradually added thereto, to prepare an aqueous dispersion medium that contained calcium phosphate as a fine sparingly water-insoluble dispersion stabilizer.

Granulation/Polymerization Step

A polymerizable monomer composition was charged into an aqueous dispersion medium, and granulation was carried out for 15 minutes while a rotational speed of 12000 rpm was maintained. Thereafter the high-speed stirrer was replaced by a propeller stirring blade, and polymerization was continued for 5 hours at an internal temperature of 60° C. The internal temperature was then raised to 80° C., and polymerization was continued for a further 3 hours. Once the polymerization reaction was over, the residual monomer was distilled off at 80° C. under reduced pressure, with subsequent cooling down to 30° C., to yield a polymer fine particle dispersion.

Washing/Drying Step

The obtained polymer fine particle dispersion was transferred to a washing container, and pH was adjusted to 1.5 through addition of dilute hydrochloric acid while under stirring. The dispersion was stirred for 2 hours, followed by solid-liquid separation using a filter, to yield polymer fine particles. The obtained polymer fine particles were charged into 1.0 L of ion-exchanged water, with stirring, to produce a dispersion again, followed by solid-liquid separation using a filter. This operation was performed three times, and thereafter the polymer fine particles resulting from the final solid-liquid separation were sufficiently dried in a dryer at 30° C., to yield Toner particle 1 having a weight-average particle diameter (D4) of 6.8 μm.

Production Example of Toner 1

Herein 2.0 parts of External additive 1 were mixed with 100 parts of Toner particle 1, using an FM mixer (by Nippon Coke & Engineering Co., Ltd.). The external addition conditions included 1.8 kg as the input amount of toner particle, a rotational speed of 3600 rpm, and an external addition time of 30 minutes. Thereafter, Toner 1 was obtained through sifting using a sieve having a mesh opening of 200 μm.

Production Examples of Toners 2 to 19

Toners 2 to 19 were obtained in the same way except that the external additive used in the production example of Toner 1 was modified as given in Table 3.

Production Example of Toner 20

Herein 2.0 parts of External additive 16 and 1.0 part of External additive 17 were mixed with 100 parts of Toner particle 1, using an FM mixer (by Nippon Coke & Engineering Co., Ltd.). The external addition conditions included 1.8 kg as the input amount of toner particle, a rotational speed of 3600 rpm, and an external addition time of 30 minutes. Thereafter, Toner 20 was obtained through sifting using a sieve having a mesh opening of 200 μm.

Examples 1, 4 to 15 and Comparative Examples 1 to 5

The methods of the various evaluations performed on Toner 1 and Toners 4 to 20 are described below. Evaluation results are given in Table 3. A laser beam printer LBP652C by Canon Inc. was used in the evaluations. Toner was removed from the cyan cartridge, which was then respectively filled with Toners 1 and 4 to 20, and the following evaluations were carried out.

Evaluation of Fogging

Performance by charge amount control of the external additive was evaluated on the basis of a fogging evaluation. In an environment at 15° C. and humidity 10.0% RH, which is a harsh environment in terms of charge-up, there were outputted 3000 images, followed by output of an image having a white background, whereupon fogging density (%) was calculated on the basis of the difference between the whiteness of the white background portion and the whiteness of evaluation paper, as measured using "REFLECTOMETER MODEL TC-6DS: by Tokyo Denshoku Co., Ltd.); fogging was then evaluated in accordance with the criteria below. An amber light filter was used as the filter. A rating of C or better was deemed as good.

A: 0.5% or lower
B: from 0.6% to 1.5%
C: from 1.6% to 2.5%
D: 2.6% or higher

Evaluation of Transferability

Performance accompanying leakage of the external additive was evaluated through evaluation of transferability. Transferability was evaluated in a high-temperature, high-humidity environment (temperature of 30.0° C., relative humidity of 85%), which is assumed to be harsher in terms of transferability. The evaluation paper used was FOX RIVER BOND paper (110 g/m$^2$), which is a rough paper. Untransferred toner on a photosensitive member after solid black image transfer was taped using a polyester adhesive tape (No. 31B, width 15 mm) (by Nitto Denko Corporation) and was stripped off. Herein C was the value of Macbeth reflection density on the tape affixed onto the paper, D was the value of the Macbeth density of an instance where the tape was applied to paper with toner on the paper after transfer but before fixing, and E was the value of the Macbeth density of the tape applied to unused paper. As a close approximation, transferability was calculated approximately in accordance with the expression below. The larger the resulting numerical value, the better is the transferability denoted thereby. A rating of C or better was deemed as good.

$$\text{Transferability } (\%)=\{(D-C)/(D-E)\}\times 100$$

A: transferability of 95% or higher
B: transferability from 90% to less than 95%
C: transferability from 85% to less than 90%
D: transferability lower than 85%.

Evaluation of Image Density

Performance depending on the durability of the external additive was evaluated on the basis of changes in image density. Image density was evaluated in a high-temperature, high-humidity environment (temperature of 30.0° C., relative humidity of 80%). As a long-term durability test, an output test for a total of 12000 prints was carried out in a mode where a horizontal line pattern having an image coverage of 1% was set to 1 sheet/1 job, according to a setting such that the equipment stopped between jobs, with the next job starting thereafter. The difference in image density between the first print and the 12000th print was measured. Herein there was used A4 paper for color laser copiers (by Canon Inc., 80 g/m$^2$). Image density was measured by outputting a 5 mm×5 mm solid black patch image, and by measuring reflection density using an SPI filter in a Macbeth densitometer (by Macbeth Corporation), which is a reflection densitometer. The smaller the difference in image density between the first print and the 12000th print, the better is the durability denoted thereby, with a rating of C or better being deemed as good.

A: difference in image density smaller than 0.10.
B: difference in image density from 0.10 to less than 0.20.
C: difference in image density from 0.20 to less than 0.25.
D: difference in image density of 0.25 or more.

Evaluation results are given in Table 3.

[Table 3]

TABLE 3

| | Toner No. | External additive No. | Number-average particle diameter (nm) of core of external additive | Number-average particle diameter (nm) of external additive after surface treatment | Transferability (leak resistance) | Fogging (electrification charge amount) | Image density difference (durability) |
|---|---|---|---|---|---|---|---|
| Example 1 | 1 | 1 | 100 | 105 | A | A | A |
| Example 2 | 2 | 2 | 100 | 103 | — | — | — |
| Example 3 | 3 | 3 | 100 | 102 | — | — | — |
| Example 4 | 4 | 13 | 7 | 9 | C | C | C |
| Example 5 | 5 | 4 | 10 | 14 | B | B | B |
| Example 6 | 6 | 5 | 30 | 33 | A | A | A |
| Example 7 | 7 | 6 | 50 | 55 | A | A | A |
| Example 8 | 8 | 7 | 70 | 74 | A | A | A |

TABLE 3-continued

| | Toner No. | External additive No. | Number-average particle diameter (nm) of core of external additive | Number-average particle diameter (nm) of external additive after surface treatment | Transferability (leak resistance) | Fogging (electrification charge amount) | Image density difference (durability) |
|---|---|---|---|---|---|---|---|
| Example 9 | 9 | 8 | 200 | 205 | A | A | A |
| Example 10 | 10 | 9 | 300 | 305 | A | A | A |
| Example 11 | 11 | 10 | 400 | 405 | A | A | A |
| Example 12 | 12 | 11 | 500 | 504 | A | B | B |
| Example 13 | 13 | 12 | 600 | 604 | A | C | C |
| Example 14 | 14 | 14 | 100 | 105 | A | A | A |
| Example 15 | 15 | 15 | 100 | 104 | A | A | A |
| Comparative example1 | 16 | 16 | 33 | 33 | D | D | C |
| Comparative example2 | 17 | 17 | 100 | 100 | D | C | B |
| Comparative example3 | 18 | 18 | 100 | 102 | D | D | B |
| Comparative example4 | 19 | 19 | — | — | D | B | B |
| Comparative example5 | 20 | 16 & 17 | — | — | D | B | B |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-110963 filed Jul. 2, 2021, and Japanese Patent Application No. 2022-090407 filed Jun. 2, 2022, which are hereby incorporated by reference herein in their entirety.

What is claimed is:

1. An external additive for a toner, comprising:

a silica particle surface-treated with a polyhydric acid metal salt particle, wherein the polyhydric acid metal salt particle is a particle of a titanium phosphate compound or a titanium carbonate compound, and the external additive has a relative dielectric constant of 2.10 to 2.20 at the frequency at which a dielectric loss tangent tan δ is minimum in a sweep frequency range of 1 MHz to 0.01 Hz.

2. The external additive for a toner according to claim 1, wherein the polyhydric acid metal salt particle is present in the silica particle at a content of 0.01 to 1.00 mass %.

3. The external additive for a toner according to claim 1, wherein the polyhydric acid is phosphoric acid.

4. The external additive for a toner according to claim 1, wherein the silica particle has a number-average particle diameter of 10 to 500 nm.

5. The external additive for a toner according to claim 1, wherein the silica particle is sol-gel silica particle.

6. A toner, comprising:

a toner particle; and an external additive on the surface of the toner particle, wherein the external additive is the external additive for a toner according to claim 1.

* * * * *